United States Patent [19]

Reiner

[11] Patent Number: 5,302,013
[45] Date of Patent: Apr. 12, 1994

[54] LOCKABLE BEAUTY SUPPLIES TROLLEY

[76] Inventor: Kenneth Reiner, 1455 La Perla Ave., Long Beach, Calif. 90815

[21] Appl. No.: 829,768

[22] Filed: Jan. 31, 1992

[51] Int. Cl.$^5$ ............................................. A47B 96/00
[52] U.S. Cl. .............................. 312/249.11; 312/323; 160/203
[58] Field of Search ............ 312/249.1, 249.8, 249.11, 312/328, 322, 323, 297; 160/214, 210, 203, 206

[56] References Cited

U.S. PATENT DOCUMENTS

| 1,050,680 | 1/1913 | Naulty | 312/322 |
|---|---|---|---|
| 2,231,005 | 2/1941 | Gordon | 312/297 |
| 2,330,670 | 9/1943 | Black | 312/297 |
| 2,646,843 | 7/1953 | Adler | 160/210 |
| 2,707,992 | 5/1955 | Stollman | 160/210 |
| 3,044,841 | 7/1962 | Hein | 312/297 |
| 3,814,493 | 6/1974 | Radke | 312/297 |
| 3,870,391 | 3/1975 | Nims | 312/297 |
| 5,069,466 | 12/1991 | Propst | 312/328 |
| 5,131,449 | 7/1992 | Winn | 160/206 |

FOREIGN PATENT DOCUMENTS

| 1212889 | 10/1958 | France | 312/323 |
|---|---|---|---|
| 305727 | 2/1933 | Italy | 312/154 |
| 94387 | 6/1959 | Norway | 312/323 |
| 391892 | 5/1933 | United Kingdom | 312/189 |

Primary Examiner—Flemming Saether
Attorney, Agent, or Firm—Fulwider Patton Lee & Utecht

[57] ABSTRACT

A lockable beauty supplies trolley for use in beauty salons includes a housing having an open front end provided with upper and lower doors that are hinged together to move from a vertically aligned closed position to a retracted folded-together position within the housing.

19 Claims, 5 Drawing Sheets

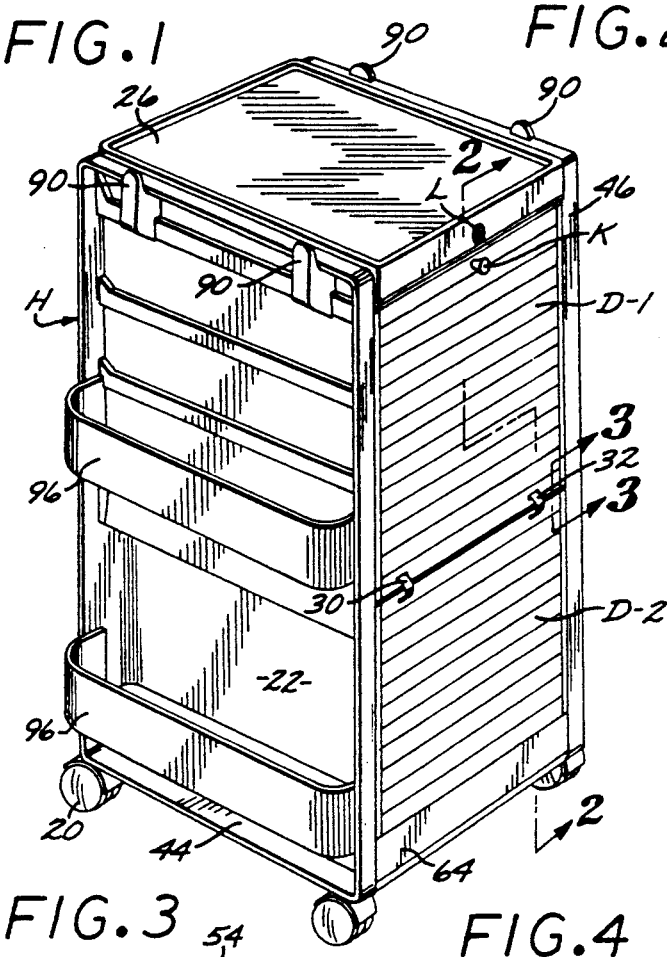
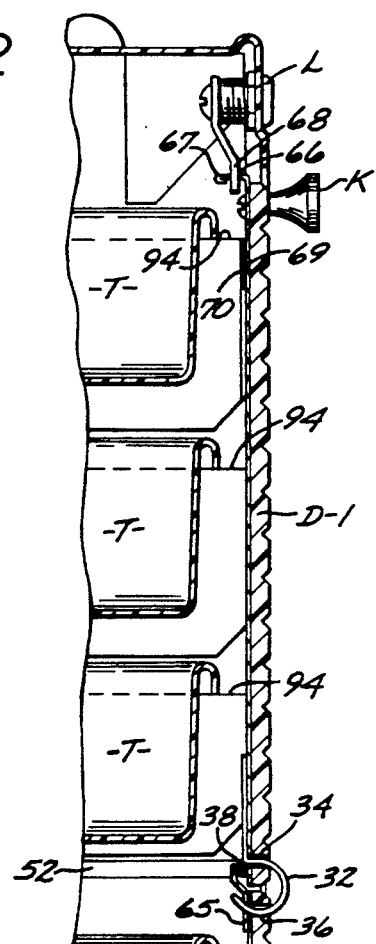
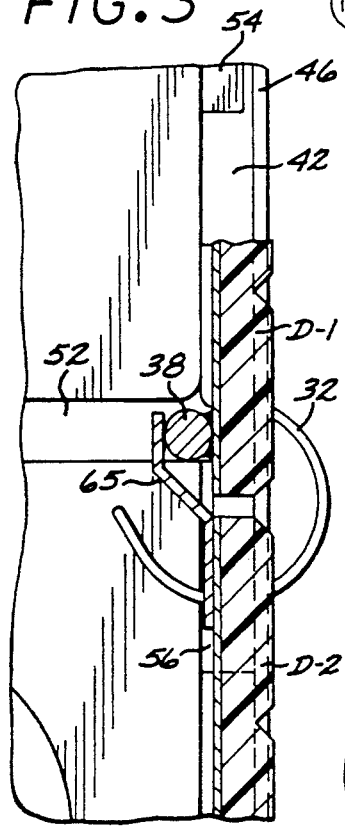
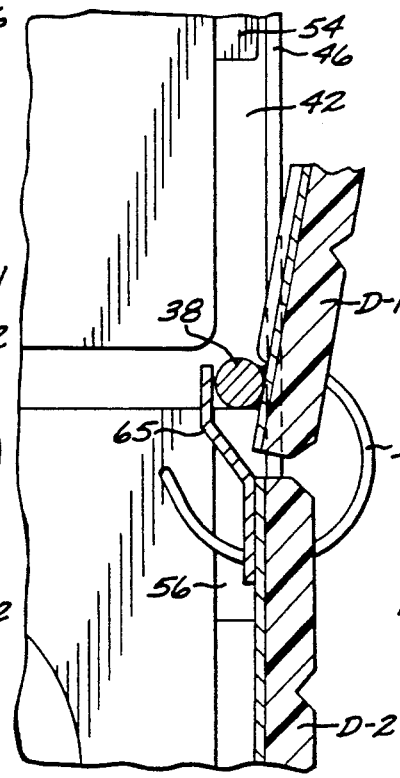
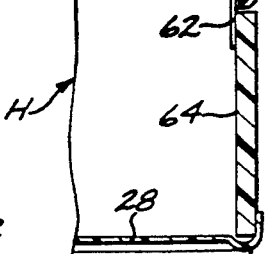

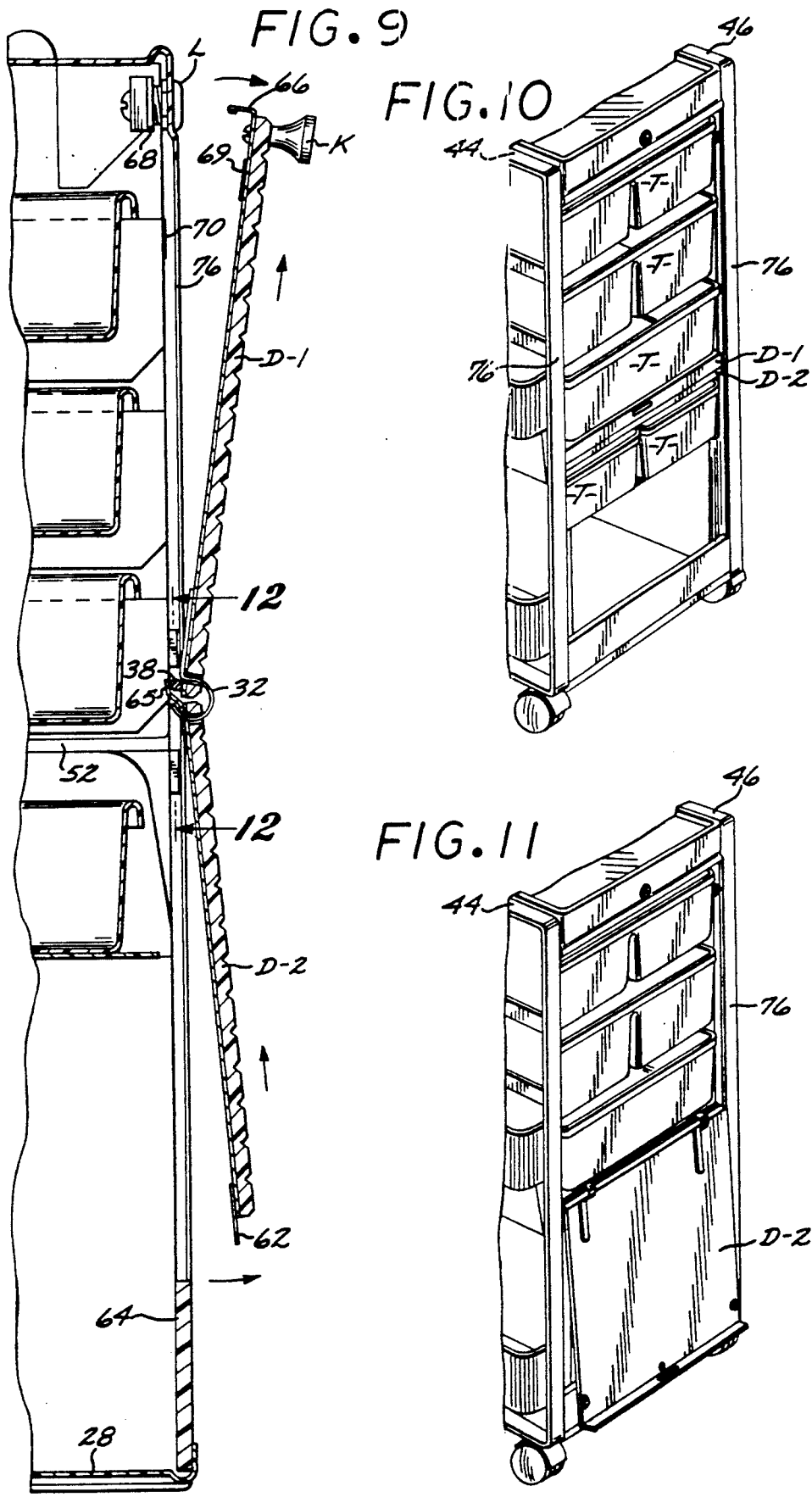

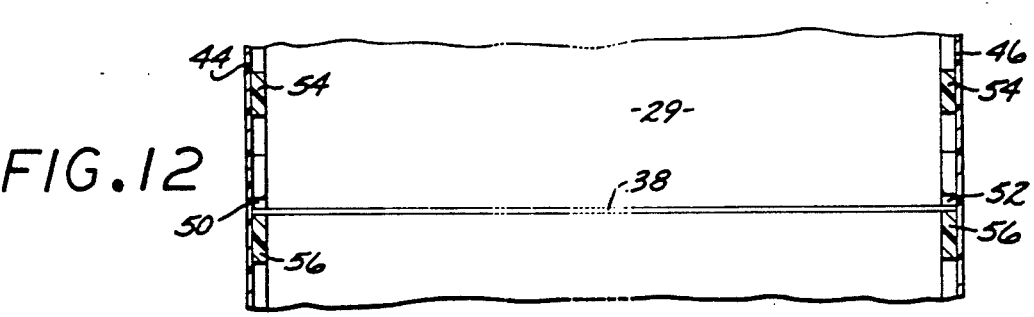
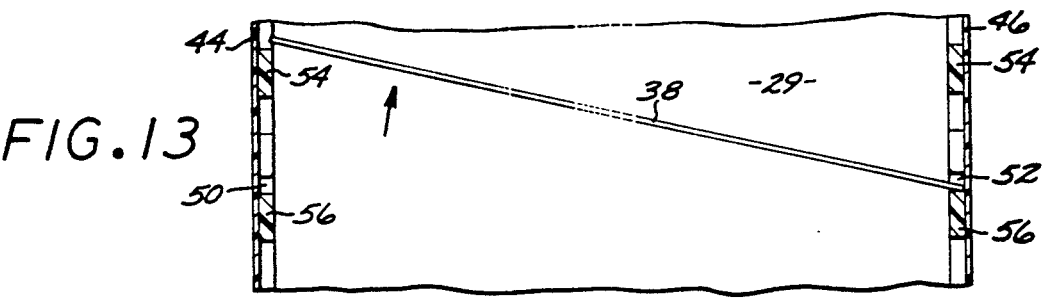
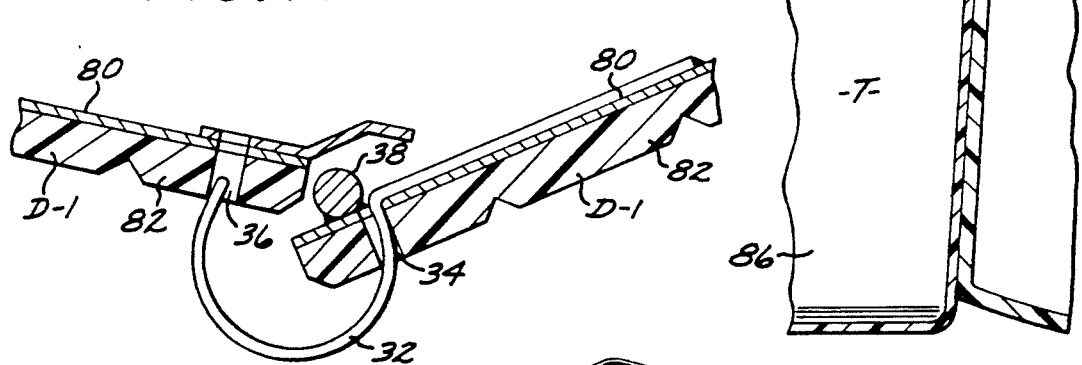
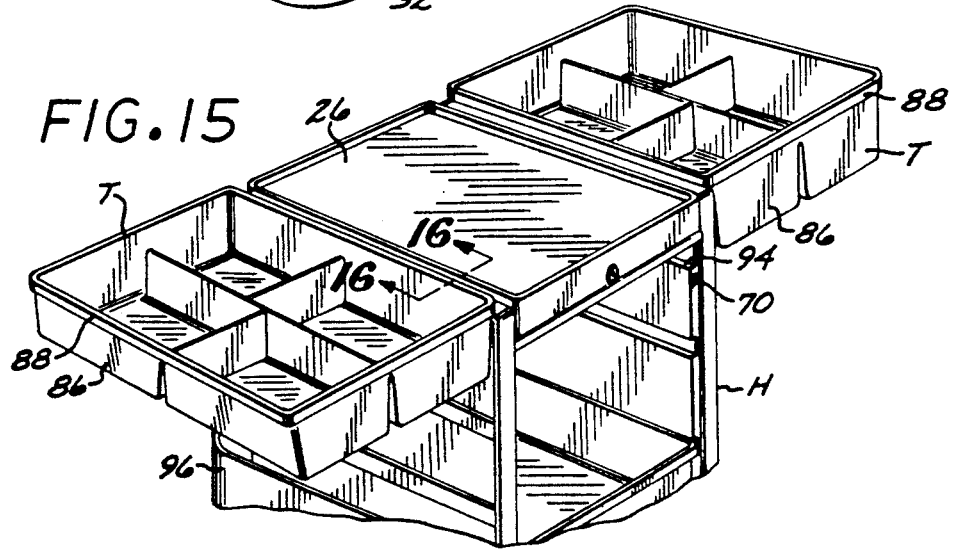

LOCKABLE BEAUTY SUPPLIES TROLLEY

BACKGROUND OF THE INVENTION

This invention relates to improvements in trolleys or cabinets for beauty salons used by beauty operators in the course of providing services to their customers. Beauty operators usually prefer to maintain their individual supplies separate from those of other operators employed at the same salon. It is a problem, however, that one operator will often borrow supplies from another operator without the consent of the first operator. This practice is not only annoying, but also can be costly. It has been heretofore proposed to provide a trolley having a plurality of removable trays for holding beauty supplies, with such trolley being provided with a lockable door. Such prior art trolleys have used doors having a rolled-up slat construction wherein the ends of the slats slide within vertical tracks positioned along the sides of the front end of the trolley. The primary disadvantages of such prior art door construction is that the interior tracks along which the slats ride become dirty or their edges frayed, and the door is then difficult to move. Additionally, the rolled-up slats require considerable vertical height within the trolley when the door is in an open position and thereby reduce the useable cubic space. Prior art beauty supply trolleys also used a single removable door which was hung on the back of the cabinet to expose the interior of the trolley. Although more efficient spacewise than the former, if the trolley is positioned adjacent a wall, it is necessary to move the trolley towards and away from the wall to hang and rehang the door on the rear of the trolley. Side-hinged doors were also employed, but such doors extended into the beauty operator's work area when opened and were more easily damaged in use.

SUMMARY OF THE INVENTION

The lockable beauty supplies trolley of the present invention eliminates the disadvantages of prior art enclosures of this nature by providing the front of the trolley with upper and lower doors that are readily foldable inwardly within the trolley to provide clear access to the interior of the trolley and take up very little vertical space since they lie flat against each other. The interior of the trolley may be formed with a plurality of vertically-spaced, horizontal grooves that slidably receive a plurality of trays which receive beauty supplies. These trays may be readily withdrawn from the cabinet for easy access by the beauty operator during the day. Some of the trays may be temporarily positioned at the top of the trolley while the beauty operator is working. At the end of the day, the trays may be easily reinserted within the trolley, the doors extended from within the trolley, and moved into a position closing the front of the trolley, whereafter both the upper and lower doors may be secured in place by a single key-operated lock so as to prevent loss of the tray contents. If desired, the bottom door may be left hanging in closed but unlocked position so access may be had to supplies in area behind the lower door by merely lifting the lower door forward and removing the contents, or it may be completely disengaged from the top door and solely the top door be employed to safeguard the contents of the upper portion of the trolley. Everything within the trolley, including the doors, are easily removed for cleaning and the doors are easily replaceable with new doors without the use of tools. The trolley is provided with wheels to facilitate its positioning within the beauty operator's area of the beauty shop. The simple design of a trolley made in accordance with the present invention may be formed from extruded sheet plastic, is inexpensive to manufacture, aesthetically pleasing, and yet rugged of construction so as to provide a long and trouble-free service life.

BRIEF DESCRIPTION OF THE DRAWINGS

FIG. 1 is a front perspective view of a preferred form of lockable beauty supply trolley embodying the present invention.

FIG. 2 is a fragmentary vertical sectional view taken in enlarged scale along lines 2—2 of FIG. 1.

FIG. 3 is a vertical sectional view taken in enlarged scale along lines 3—3 of FIG. 1 showing the relationship of the upper and lower doors of the trolley to the front portion of the trolley when the doors are in a closed position.

FIG. 4 is a vertical sectional view similar to FIG. 3, but showing how the doors are moved towards an open position.

FIG. 9 is a view similar to FIG. 2 but showing how the doors are moveable towards their open position.

FIG. 10 is a fragmentary view of the front portion of the trolley with the doors being shown in their completely retracted position within the trolley.

FIG. 11 is a view similar to FIG. 10, but showing the doors withdrawn from their retracted position.

FIG. 12 is a vertical sectional view taken along line 12—12 of FIG. 9 and showing the pivot pin in its normal position, but with the doors and parts of the trolley housing not being shown in the interest of clarity.

FIG. 13 is a view similar to FIG. 12 showing how the pivot pin can be removed.

FIG. 14 is fragmentary side elevational view taken partly in section showing how the lower door may be removed from the upper door.

FIG. 15 is a front perspective view similar to FIG. 1, but showing how two of the trays may be hung from the upper sides of the trolley; and FIG. 16 is a vertical sectional view taken an enlarged scale along line 16—16 of FIG. 15.

BRIEF DESCRIPTION OF A PREFERRED EMBODIMENT

Figure 5:
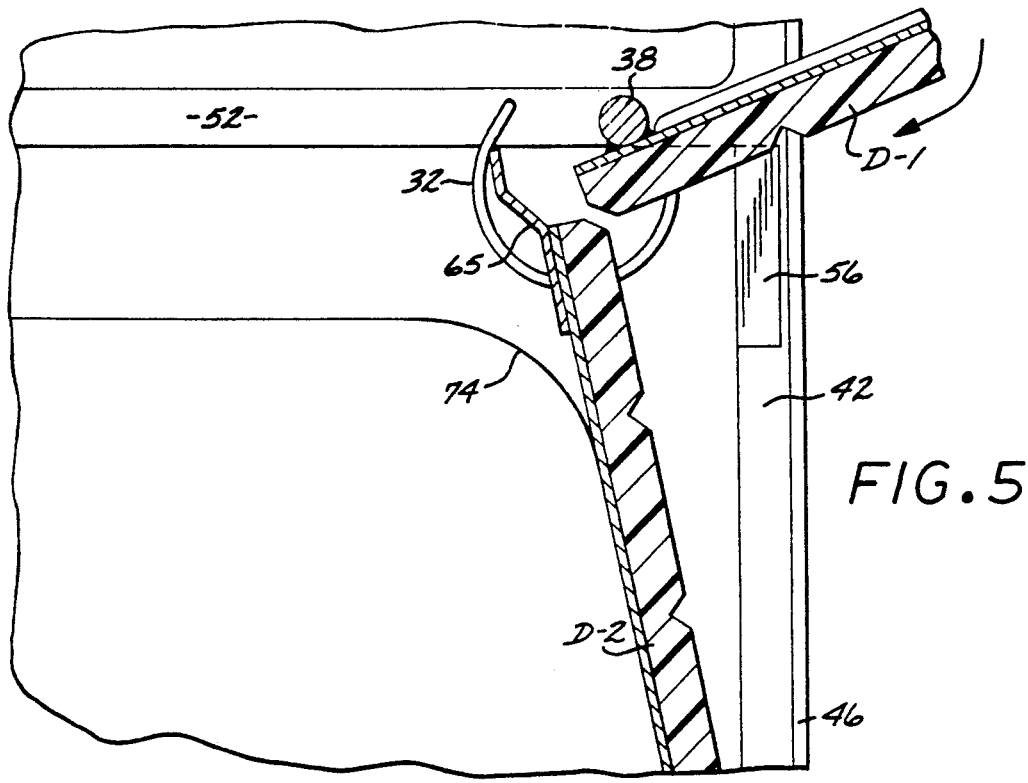
FIGS. 5-7 are side fragmentary side elevational views showing how the doors are moveable towards their retracted position within the trolley.

Referring to the drawings, a lockable beauty supplies trolley embodying the present invention includes an upright, generally rectangular housing H having castered wheels 20. The front end of housing H is open and is provided with upper and lower doors D-1 and D-2 respectively. Such doors are adapted to be locked in their closed position of FIG. 1, and to be moved into an open position shown in FIG. 7 and 10 to permit easy access to the interior of the housing. The housing includes sidewalls 22 and 24, top wall 26, bottom wall 28, and a rear wall 29. These walls are all of solid configuration whereby access to the interior of the housing is provided solely through the open front end thereof. The housing is preferably of synthetic plastic construction, although it may be fabricated of other materials. A plurality of beauty supplies-receiving trays T are removably positioned within the housing. With the doors in their locked position, the trays and their contents are secured against theft.

More particularly, the upper and lower doors D-1 and D-2 are foldable inwardly within the confines of the housing H from their vertically extending closed positions of FIG. 1. To this end, the upper and lower doors are horizontally hingedly interconnected by means of a pair of hooks 30 and 32 having their upper ends rigidly affixed to the lower portion of upper door D-1, as shown in FIG. 2. The open portions of hooks 30 and 32 extend through complimentary horizontal slots 34, formed in the lower end of the upper door, and 36, formed in the upper end of lower door, as shown in FIG. 2. A horizontally extending pivot pin 38 is rigidly affixed to the lower portion of upper door D-1 for vertical movement within vertically extending inwardly-facing grooves 40 and 42 formed in the front of a pair of generally 0-shaped track members 44 and 46 integral with the opposite sides of the housing H. These track members are of U-shaped transverse cross-section and will preferably be formed of a resilient, bendable synthetic plastic material. Pivot pin 38 also slides horizontally within a pair of horizontal grooves 50 and 52 formed along the interior of the housing C at the approximate midportion thereof (See FIGS. 2 and 12). The extent of vertical movement of pivot pin 38 within the track grooves 40 and 42 is normally limited by an upper pair of blocks 54 and a lower pair of blocks 56 rigidly disposed within the track grooves 40 and 42, respectively. The front end of horizontal grooves 50 and 52 coincide with the lower end of vertical grooves 40 and 42 above the lower blocks 56.

Referring now to FIG. 2, the bottom portion of lower door D-2 is provided with a pair of depending retainers 62. These retainers abut the interior of a vertically extending panel 64 that extends horizontally along the bottom front of the housing H to normally restrain outward movement of the bottom of the lower door D-2 when the doors are in their closed position of FIG. 2. The upper rear mid-portion of the lower door is provided with a joggled strap 65 that extends upwardly to engage pivot pin 38 at the rear lower end of the upper door to retain the adjoining edges of the doors in vertical alignment when arranged in their closed position. The top of upper door D-1 is formed with a rearwardly extending flange 66 which is, in turn, formed at its midportion with an elongated slot 67. The slot 67 receives the keeper 68 of a conventional key-operated lock L to secure the doors in their locked position. A pair of Velcro pads 69 attached to the upper inner edges of upper door D-1 engage a complementary pair of Velcro pads 70 attached to the upper inner portion of housing H to releasably retain the upper door in its closed position independent of lock L (See FIGS. 2 and 9). The Velcro pads may be replaced by magnets or other easily releasable holding means.

In order to open the locked doors, (a key, not shown) is inserted within the lock L and the keeper 68 is rotated out of the flange slot 67. The top of the upper door D-1 is then pulled forwardly as shown in FIG. 9 by a conventional knob K secured to the top of the door. The upper door, together with lower door D-2, through its interconnection to the upper door by hooks 30 and 32 is pulled upwardly until the retainers 60 and 62 clear the upper edge of panel 64, then it is dropped to where the pivot pin 38 rests against the blocks 56, with the retainers forward of panel 64.

Figure 6:
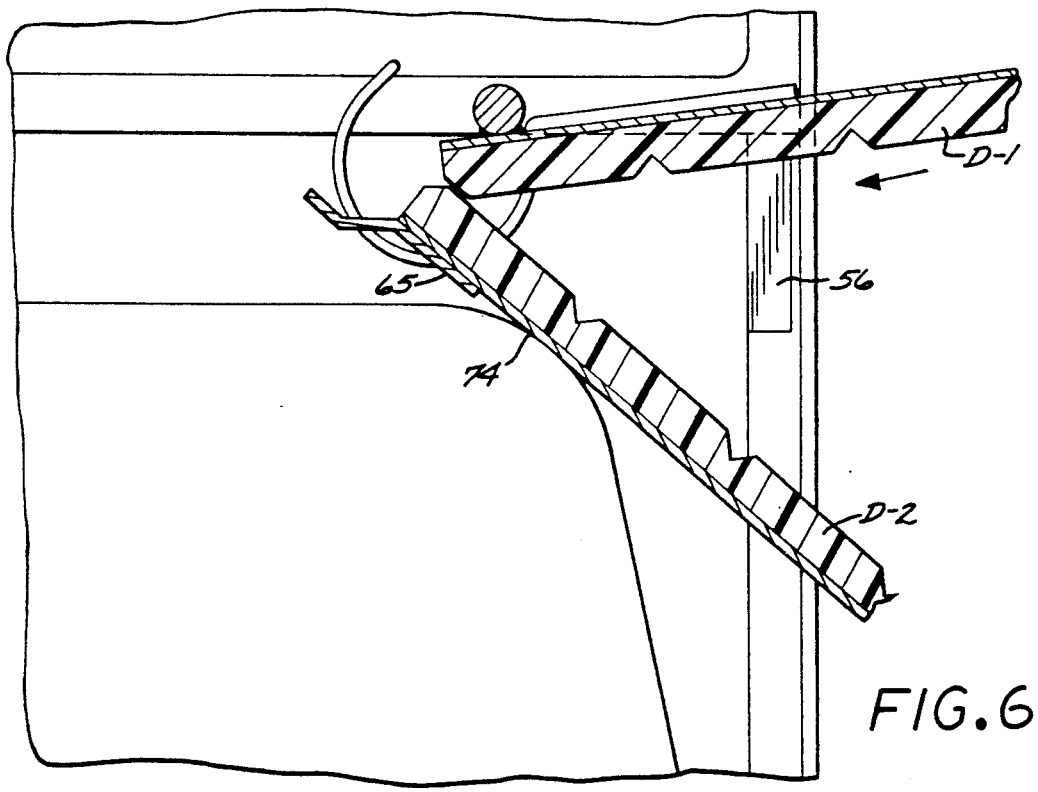
Figure 7:
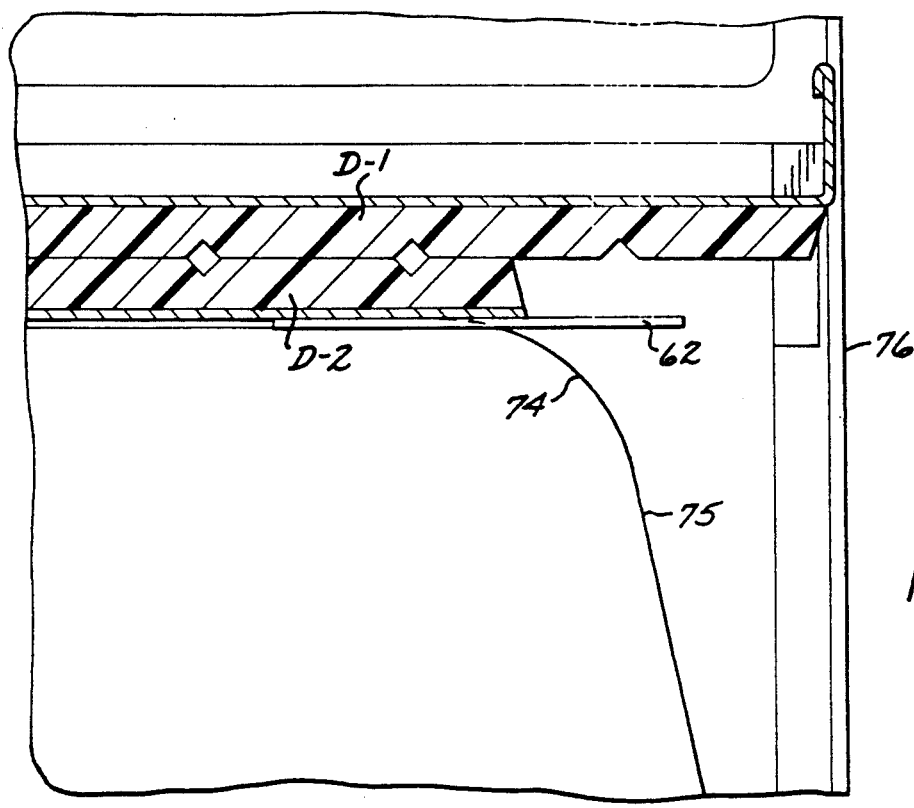
Figure 8:
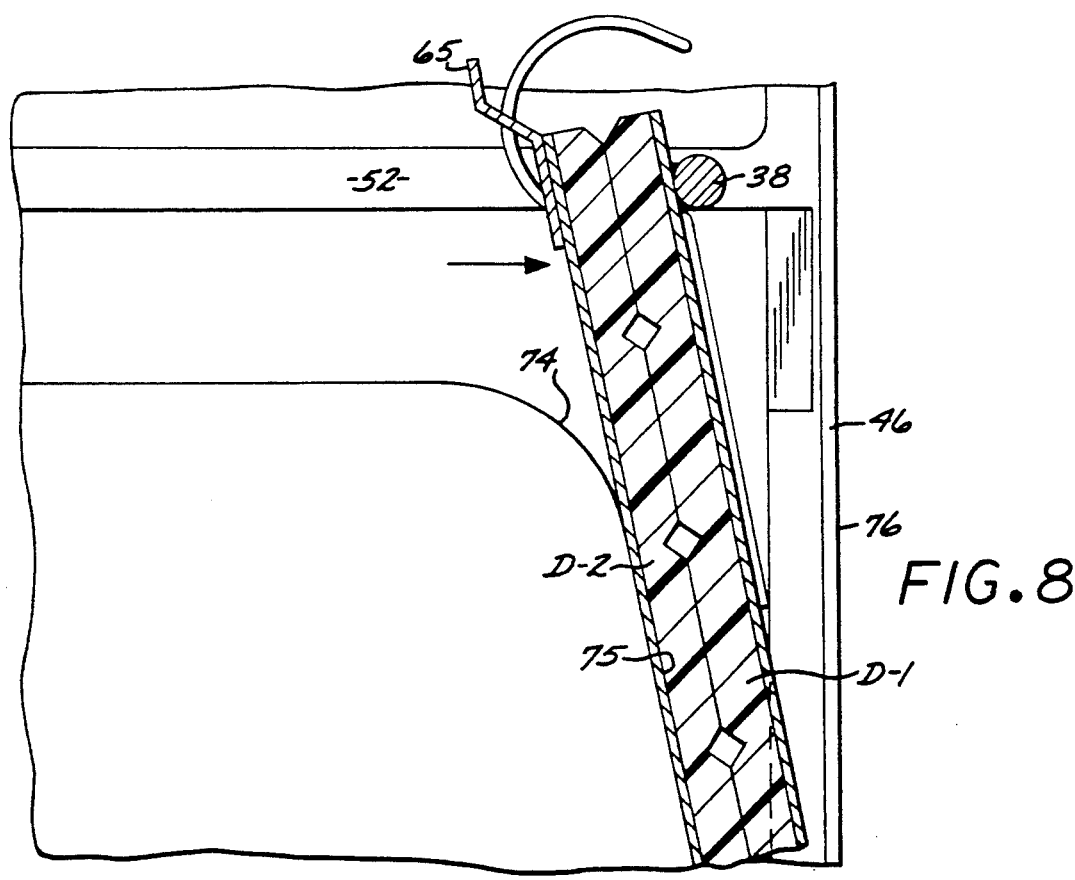
FIG. 8 is a view similar to FIGS. 5-7 showing the doors being withdrawn from the interior of the trolley and resting against the housing cut-outs.

Referring now to FIGS. 5-7, the doors are then folded together such that their front surfaces are juxtaposed facing one another, with the top of the lower door D-1 sliding along inwardly along hooks 30 and 32. As the doors are folded together, they are retracted within the interior of the housing as pivot pin 38 slides horizontally and rearwardly along grooves 50 and 52 until the doors reach their completely retracted position of FIG. 7. In this position, the doors occupy comparatively little interior housing space, and additionally, the upper surface of the upper door may be utilized as a temporary shelf. Referring now to FIG. 8, when it is desired to withdraw the folded-together doors from within the housing, the doors are moved forwardly with the pivot pin 38 sliding along the horizontal grooves 50 and 52 towards the front of the housing. The inner surfaces of housing sidewalls 22 and 24 are formed with horizontal surfaces 73 that merge into forwardly and downwardly curved camming surfaces 74 which are abutted by the side edges of the lower door D-2 as this door is retracted and extended relative to the housing. When the doors are retracted they are supported on surfaces 73. The housing sidewalls are also formed outwardly of camming surfaces 74 with downwardly and forwardly extending cut-outs 75 that terminate at the front of the housing H, as shown in FIGS. 5-8 and 11. With this arrangement, should the doors be suddenly dropped from their position of FIG. 8, the cut-outs 75 provide clearance for the pivot pin to snap rearwardly and thereby avoid the application of pressure between the tracks 44 and 46 and the pivot pin. When it is desired to lock the cabinet with a key, as the lower door D-2 reaches the end of its bottom-most position, it will may be urged rearwardly manually whereby retainers 62 are moved behind the panel 64. The upper end of the upper door D-1 is moved rearwardly until slot 67 is in vertical alignment with keeper 68 of the key-operated lock L. The lock may then be actuated to move the keeper within the slot, and thus secure both doors in a locked position.

Referring to FIG. 11, the beauty operator may desire to work with only the upper portion of the housing freely accessible. In such event, the doors may be extended from the housing and the upper door will be permitted to overlie the lower door as shown in this figure. If the retainers 62 are disposed forwardly of base plate 64, the doors may be pivoted upwardly for access to the lower portion of housing H also.

Referring now to FIGS. 9, 12 and 13, it will be understood that the lower blocks 56 restrain downward movement of pivot pin 38 during operation of the doors. However, the pivot pin 38 may be withdrawn from the housing so as to permit removal of the doors by urging the left-hand end of the pivot pin upwardly from its horizontal position of FIG. 12 to its inclined position of FIG. 13 above the left-hand upper block 54. To accomplish this, the resilient bendable nature of the tracks 44 and 46 permit the pivot pin to be urged forwardly as the front wall 76 of track 44 is flexed outwardly within its elastic limit until the left-hand end of the pivot pin is free of the left-hand track 44. The pivot pin and doors may then be withdrawn forwardly through the front end of the housing. In this manner, easy access to the doors for cleaning or replacement is made possible.

Referring to FIG. 14, if the beauty operator wishes to utilize solely the upper door D-1, rather than both the upper and lower doors, the lower door D-2 may be easily slid off of the free ends of the hooks 30 and 32, as shown in this figure after having removed both doors as described herein before. FIG. 14 also indicates a preferred construction of the doors D-1 and D-2. Each door is made up of a rectangular metallic sheet 80 to the front surface of which is affixed a decorative panel 82. Such panel may be fabricated from a synthetic plastic so as to provide a corrugated pattern of an aesthetically pleasing design, or any other aesthetically pleasing material, such as high pressure laminates, linoleum or the like.

Referring now to FIGS. 15 and 16, the beauty supplies-receiving trays T will preferably be of molded synthetic plastic construction utilizing a body 86, and an integral lip 88 of inverted U-shaped configuration which defines the upper edge portion of the body. One or more of the trays may be compartmented. The lip 88 of each tray is designed to be removably disposed upon ears 90 formed at the upper side portions of the housing H (See FIGS. 1 and 16). With this arrangement, two of the trays may be withdrawn from within the housing and hung upon the housing ears 90 to facilitate ready access to the beauty supplies contained within the trays by the beauty operator. The top wall 26 of the housing may also be employed to receive beauty supplies. The tray lips 88 are slidably supported within housing H by a plurality of pairs of aligned horizontal ledges 94 integrally formed on the interior of housing sidewalls 22 and 24 (FIGS. 2 and 15). Open-topped tubs 96 may be attached to the side walls 22 and 26 to receive additional beauty supplies.

From the forgoing detailed description, it will be seen that a lockable beauty supplies trolley embodying the present invention provides an attractive housing and/or security for the beauty supplies of an individual beauty supply operator. The folding doors occupy a minimum of interior space within the trolley housing. Some of the trays may be temporarily positioned at the top of the trolley housing while the beauty operator is working. At the end of the beauty operator's working day, the trays and their contents are easily re-inserted within the housing. Both the exterior and interior of the trolley housing is readily available for cleaning. The trolley housing may be vacuum molded from a sheet of inexpensive synthetic plastic material at a comparatively low cost. The trolley lends itself to a simple and rugged, yet aesthetically pleasing appearance which will be attractive to both beauty shop operators and their clients.

It should be understood that although I have described a beauty supplies trolley, the basic combination of parts may be employed to construct any type of easily openable and closable cabinet for security, cleanliness and simplicity of design. By way of example, housing H may be incorporated as a cabinet in a manicurist's table to support one end of such table and to provide a secure storage space for supplies.

Various other modifications and changes may be made with respect to the foregoing detailed description without departing from the spirit of the present invention.

I claim:

1. An easily openable and closeable cabinet comprising:
   a housing having sidewalls with upper and lower ends, a top wall, a bottom wall, a rear wall and an open front end;
   rigid upper and lower doors having front and back surfaces are horizontally hinged together at a upper end of the lower door and a lower end of the upper door;
   horizontal extending pin means secured to the back surface of the lower end of the upper door;
   horizontal grooves formed on a interior of the sidewalls between said upper and lower ends, said grooves being aligned to receive and guide both the pin means and edges of the doors as the doors are moved from a vertically aligned closed position to a retracted folded-together horizontal position entirely within the cabinet wherein when the doors are in the retraced position their front surfaces are juxtaposed facing one another;
   horizontal surfaces formed on the interior of the housing below said grooves to support the edges of the doors in said retracted horizontal position; and
   means to releasably hold the upper door in its vertical closed position.

2. A cabinet as set forth in claim 1 wherein an easily releasable holding means secures a top of the upper door against the cabinet.

3. A cabinet as set forth in claim 2 wherein the sidewalls of the housing are formed with forwardly and downwardly extending camming surfaces along which the lower door slides as it is moved relative to the housing; and
   a forwardly and downwardly extending cut-out forms a continuation of the camming surfaces to provide clearance of the doors if both doors are dropped during retraction from within the housing whereby the pin means is not snapped forwardly against the front of the housing.

4. A cabinet as set forth in claim 1 wherein a key-operated lock is operatively interposed between the upper door and the cabinet.

5. A cabinet as set forth in claim 1 wherein the sidewalls of the housing are formed with forwardly and downwardly extending camming surfaces at a front of said horizontal surfaces along which the lower door slides as it is moved relative to the housing; and
   a forwardly and downwardly extending cut-out forms a continuation of the camming surfaces to provide clearance for the doors if both doors are dropped during retraction from within the housing whereby the pin means is not snapped forwardly against the front of the housing.

6. A cabinet as set forth in claim 1 wherein a key-operated lock is operatively interposed between a upper end of the cabinet and a top of the upper door, and easily releasable holding means are also interposed between the cabinet and the top of the upper door to releasably secure the upper door to the cabinet when the lock is not activated.

7. A cabinet as set forth in claim 6 wherein the doors are hinged together by hooks that are affixed to one door and extend through slots formed in the other door.

8. A cabinet as set forth in claim 1 wherein the doors are hinged together by hooks that are affixed to one door and extend through slots formed in the other door.

9. A cabinet as set forth in claim 8 wherein a bottom of the lower door is provided with retainer means that extend behind a panel on a lower portion of the housing to restrain outward movement of the lower door in its closed position.

10. A cabinet as set forth in claim 8 wherein the doors are hinged together by hooks that are affixed to the upper door and extend through slots formed in the lower door.

11. A cabinet as set forth in claim 1 wherein a bottom of the lower door is provided with retainer means that extend behind a panel on the lower portion of the housing to restrain outward movement of the lower door in its closed position.

12. A cabinet as set forth in claim 11 wherein the sidewalls of the housing are formed with forwardly and downwardly extending camming surfaces along which the lower door slides as it is moved relative to the housing; and a forwardly and downwardly extending cut-out forms a continuation of the camming surfaces to provide clearance for the doors if both doors are dropped during retraction from within the housing whereby the pin means is not snapped forwardly against the front of the housing.

13. A cabinet as set forth in claim 12 wherein a plurality of beauty supplies trays having sides are removably disposed within the housing, said trays having lip means at their sides; and the housing is formed with ear means that receive said lip means to removably support the trays in the housing.

14. A cabinet as set forth in claim 1 wherein a plurality of beauty supplies trays having sides are removably disposed within the housing, said trays having lip means at their sides; and the housing is formed with ear means that receive said lip means to removeably support the trays in the housing.

15. A cabinet comprising:

a housing that includes a pair of sidewalls having upper and lower ends each provided with a vertical track formed to each side of a open front end defining a pair of aligned vertical grooves, a front wall of each track being formed of a resilient, bendable material;

horizontally aligned pairs of vertically spaced blocks in the groves of said track;

upper and lower doors having front and back surfaces are hinged together at a lower end of the upper door and a upper end of the lower door;

a horizontal pivot pin having ends secured to the lower end of the upper doors;

aligned horizontal grooves formed on the interior of a sidewalls between upper and lower ends, front ends of the horizontal grooves intersecting said vertical grooves between said blocks, with the ends of the pivot pin sliding within said horizontal grooves as the doors are moved from a vertically aligned closed position to a retracted folded-together horizontal position within the housing wherein when the doors are in the retraced position their front surfaces are juxtaposed facing one another;

horizontal surfaces formed on the interior of the housing below said grooves to support edges of the doors in said retracted horizontal position; and with the pivot pin being removable from the housing by raising one end of said pin within one of said vertical grooves above one of said upper blocks and then bending the front wall of the track adjacent said one end away from the housing.

16. A cabinet as set forth in claim 15 wherein the sidewalls of the housing are formed with forwardly and downwardly extending camming surfaces along which the lower door slides as it is moved relative to the housing; and forwardly and downwardly extending cut-outs form a continuation of the camming surfaces to provide clearance for the doors if both doors are dropped during retraction from within the housing whereby the pin is not snapped forwardly against the front of the track.

17. A cabinet as set forth in claim 15 wherein easily releasable holding means releasably secure the top of a upper door against the cabinet.

18. A cabinet as set forth in claim 15 wherein a key-operated lock is operatively interposed between the upper door and the cabinet.

19. A cabinet as set forth in claim 15 wherein the doors are hinged together by hooks that are affixed to the upper door and extend through slots formed in the lower door.

* * * * *